(12) United States Patent
Agarwal et al.

(10) Patent No.: US 11,140,521 B2
(45) Date of Patent: Oct. 5, 2021

(54) METHODS AND USER EQUIPMENT FOR ENABLING RECEPTION OF MULTIMEDIA BROADCAST MULTICAST SERVICES (MBMS)

(71) Applicant: Samsung Electronics Co., Ltd., Suwon-si (KR)

(72) Inventors: Neha Agarwal, Bangalore (IN); Rohan Raj, Bangalore (IN); Ashish Kumar Gupta, Bangalore (IN); Shrinath Ramamoorthy Madhurantakam, Bengaluru (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/285,399

(22) Filed: Feb. 26, 2019

(65) Prior Publication Data

US 2020/0169849 A1    May 28, 2020

(30) Foreign Application Priority Data

Nov. 26, 2018 (IN) .............................. 201841044411

(51) Int. Cl.
| | | |
|---|---|---|
| *H04W 4/06* | (2009.01) | |
| *H04B 17/336* | (2015.01) | |
| *H04B 17/318* | (2015.01) | |
| *H04W 88/02* | (2009.01) | |

(52) U.S. Cl.
CPC ............ *H04W 4/06* (2013.01); *H04B 17/318* (2015.01); *H04B 17/336* (2015.01); *H04W 88/02* (2013.01)

(58) Field of Classification Search
CPC ...... H04W 4/06; H04W 88/02; H04B 17/318; H04B 17/336
See application file for complete search history.

(56) References Cited

U.S. PATENT DOCUMENTS

| | | | | |
|---|---|---|---|---|
| 9,131,429 | B1* | 9/2015 | Bharadwaj | H04W 4/90 |
| 9,578,473 | B1* | 2/2017 | Ponukumati | H04W 4/12 |
| 2011/0235565 | A1* | 9/2011 | Wu | H04W 72/005 |
| | | | | 370/312 |
| 2012/0236776 | A1* | 9/2012 | Zhang | H04W 72/005 |
| | | | | 370/312 |
| 2012/0263043 | A1* | 10/2012 | Xu | H04W 72/005 |
| | | | | 370/241 |

(Continued)

*Primary Examiner* — Benjamin H Elliott, IV
(74) *Attorney, Agent, or Firm* — Harness, Dickey & Pierce, P.L.C.

(57) ABSTRACT

Methods performed by a User Equipment (UE) are provided for enabling Multimedia Broadcast Multicast Services (MBMS) reception, the methods include creating, by at least one processor, a unified service guide including a list of at least one MBMS service available over at least one communication path based on information about the at least one MBMS service; selecting, by the at least one processor, a first communication path among the at least one communication path for a selected MBMS service among the list of the at least one MBMS service based on at least one of a signal condition of Multicast Broadcast Single Frequency Network (MBSFN) cell, signal conditions of a serving cell, service availability or a packet switched (PS) enabled stack; and providing, by the at least one processor, the selected MBMS service over the selected communication path.

20 Claims, 8 Drawing Sheets

(56) References Cited

U.S. PATENT DOCUMENTS

| | | | | |
|---|---|---|---|---|
| 2016/0007321 A1* | 1/2016 | Zhang | .................. | H04W 48/20 |
| | | | | 370/312 |
| 2016/0174195 A1* | 6/2016 | Lee | ..................... | H04L 65/4076 |
| | | | | 370/312 |
| 2016/0241412 A1* | 8/2016 | Panchal | .................. | H04L 5/001 |
| 2016/0285923 A1* | 9/2016 | Kodaypak | ............. | H04L 65/103 |
| 2016/0323784 A1* | 11/2016 | Ma | ........................ | H04W 76/10 |
| 2017/0079062 A1* | 3/2017 | Sabbarini | ............... | H04L 1/0051 |
| 2017/0230870 A1* | 8/2017 | Shi | .................... | H04W 36/0022 |
| 2017/0339606 A1* | 11/2017 | Kim | ......................... | H04W 36/0061 |
| 2018/0063880 A1* | 3/2018 | Bhardwaj | ............. | H04W 76/19 |
| 2018/0176887 A1* | 6/2018 | Strobl | .................. | H04W 76/40 |
| 2019/0110236 A1* | 4/2019 | Huang | ............. | H04W 36/0027 |
| 2019/0230564 A1* | 7/2019 | Kim | ........................ | H04W 4/06 |
| 2020/0169849 A1* | 5/2020 | Agarwal | .......... | H04N 21/44209 |

\* cited by examiner

METHODS AND USER EQUIPMENT FOR ENABLING RECEPTION OF MULTIMEDIA BROADCAST MULTICAST SERVICES (MBMS)

CROSS-REFERENCE TO RELATED APPLICATIONS

This application claims priority under 35 U.S.C. § 120 to, Indian Application No. 201841044411, filed Nov. 26, 2018, the entire contents of which are incorporated by reference.

TECHNICAL FIELD

Some example embodiments relate to Multimedia Broadcast Multicast Services (MBMS) and more particularly to enabling reception of MBMS service on User Equipment (UE) over multiple communication paths.

BACKGROUND

Multimedia Broadcast Multicast Service (MBMS) provides point to multipoint transmissions of multimedia data/services from a single point source to User Equipment (UEs) in a broadcast area or a multicast group over a communication path.

SUMMARY

According to some example embodiments methods performed by a User Equipment (UE) are provided for enabling Multimedia Broadcast Multicast Services (MBMS) reception. The methods include creating, by at least one processor, a unified service guide including a list of at least one MBMS service available over at least one communication path based on information about the at least one MBMS service. The methods also include selecting, by the at least one processor, a first communication path among the at least one communication path for a selected MBMS service among the list of the at least one MBMS service based on at least one of a signal condition of Multicast Broadcast Single Frequency Network (MBSFN) cell, signal conditions of a serving cell, service availability or a packet switched (PS) enabled stack. The methods also include providing, by the at least one processor, the selected MBMS service over the selected communication path.

According to some example embodiments methods performed by a User Equipment (UE) are provided for enabling Multimedia Broadcast Multicast Services (MBMS) reception. The methods include creating a unified service guide including a list of at least one MBMS service available over at least one communication path based on information about the at least one MBMS service. The methods also include selecting a first communication path among the at least one communication path for a selected MBMS service among the list of the at least one MBMS service based on at least one of a signal condition of Multicast Broadcast Single Frequency Network (MBSFN) cell, signal conditions of a serving cell, service availability or a packet switched (PS) enabled stack. The methods also include providing the selected MBMS service over the selected communication path.

Some example embodiments provide user equipment (UEs) for receiving Multimedia Broadcast Multicast Services (MBMS). a memory storing computer-readable instructions; and at least one processor configured to execute the computer-readable instructions to create a unified service guide including a list of at least one MBMS service available over at least one communication path based on information about the at least one MBMS service, select a first communication path among the at least one communication path for a selected MBMS service among the list of the at least one MBMS service based on at least one of a signal condition of Multicast Broadcast Single Frequency Network (MBSFN) cell, signal conditions of a serving cell, service availability or a packet switched (PS) enabled stack, and provide the selected MBMS service over the selected communication path.

These and other aspects of some example embodiments herein will be better appreciated and understood when considered in conjunction with the following description and the accompanying drawings. It should be understood, however, that the following descriptions, while indicating some example embodiments and numerous specific details thereof, are given by way of illustration and not of limitation. Many changes and modifications may be made within the scope of some example embodiments herein without departing from the spirit thereof.

BRIEF DESCRIPTION OF THE DRAWINGS

Some example embodiments are illustrated in the accompanying drawings, throughout which like reference letters indicate corresponding parts in the various figures. Some example embodiments herein will be better understood from the following description with reference to the drawings, in which.

DETAILED DESCRIPTION

Figure 1:
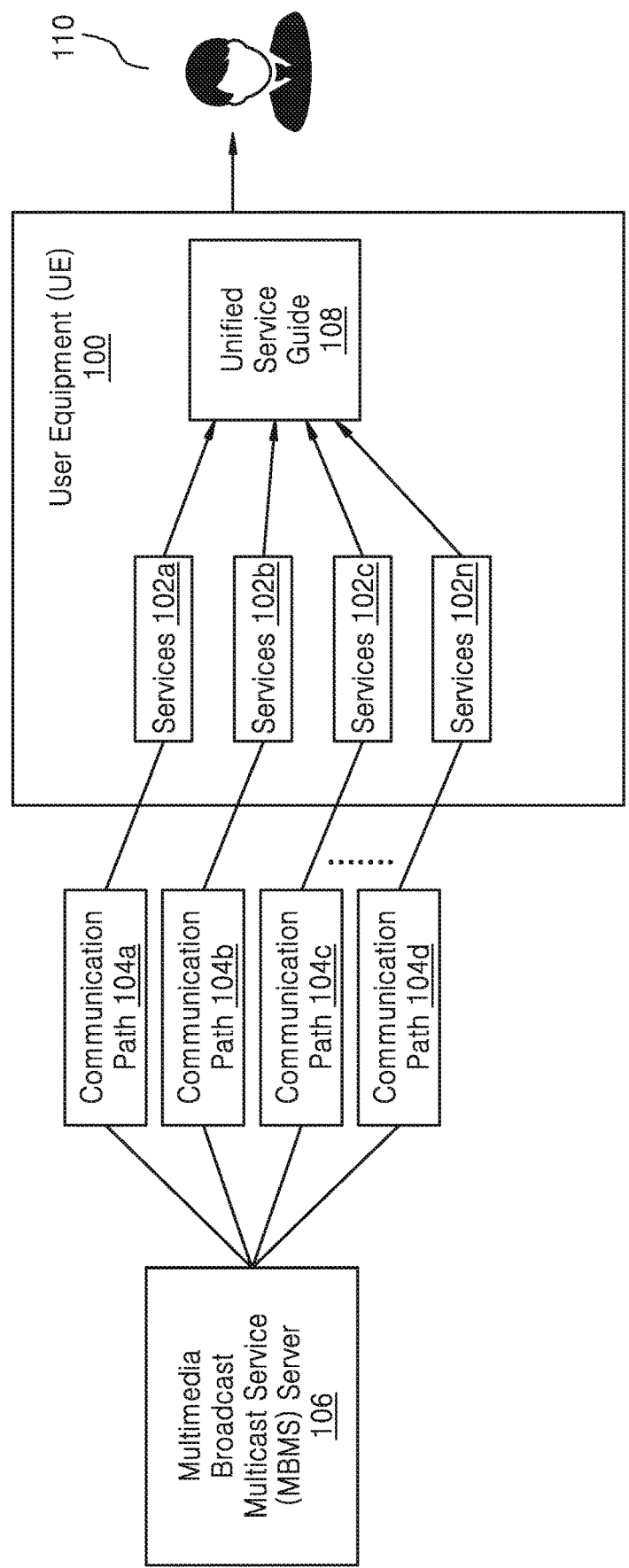
FIG. 1 is an example overview diagram illustrating reception of Multimedia Broadcast Multicast Services (MBMS) on User Equipment (UE) supporting two or more Subscriber Identity Modules (SIMs), according to some example embodiments as disclosed herein.

Some example embodiments and the various features and advantageous details thereof are explained more fully with reference to the accompanying drawings and detailed in the following description. Descriptions of well-known components and processing techniques are omitted so as to not unnecessarily obscure some example embodiments. The description herein is intended merely to facilitate an understanding of ways in which some example embodiments herein may be practiced and to further enable those of skill in the art to practice some example embodiments. Accordingly, this disclosure should not be construed as limiting the scope of some example embodiments.

Some example embodiments provide methods and systems for enabling Multimedia Broadcast Multicast Services (MBMS) reception on User Equipment (UE), wherein the UE supports the MBMS service reception from one or more communication paths.

A method disclosed herein includes receiving information about one or more MBMS services available over the one or more communication paths. Further, the method includes creating a unified service guide by combining the one or more MBMS services available over the one or more communication paths.

Further, the method includes selecting a communication path from the one or more communication paths for a MBMS service selected from the unified service guide. The communication path may be selected by checking one or more criteria. The one or more criteria may be, but is not limited to, signal condition of Multicast Broadcast Single Frequency Network (MBSFN) cell, signal condition of (MBMS reference signal strength (MRS), Reference Signal Received Power (RSRP), Signal-to-Interference-Plus-Noise Ratio (SINR) and so on), service availability and packet switched (PS) enabled stack. Further, the method includes providing the selected MBMS service to the user over the communication path selected from the one or more communication paths.

Further, the method includes continuous monitoring of a desired MBMS service over one or more communication paths to enable faster delivery of desired MBMS services when the desired MBMS service becomes available. The one or more communication paths may be monitored by monitoring a Multicast Control Channel (MCCH) change notification for availability of new MBMS services.

Further, the method includes performing Radio Frequency (RF) arbitration in order to ensure RF availability to the communication path around a MCCH change notification scheduling time.

Referring now to the drawings, and more particularly to FIGS. 1 through 7, where similar reference characters denote corresponding features consistently throughout the figures, there are shown some example embodiments.

FIG. 1 is an example overview diagram illustrating reception of Multimedia Broadcast Multicast Services (MBMS) on User Equipment (UE) 100 supporting two or more Subscriber Identity Modules (SIMs), according to some example embodiments as disclosed herein.

According to some example embodiments, reception of one or more MBMS services 102a-102n or enhanced MBMS (eMBMS) services on the UE 100 is enabled. The UE 100 may be, any wireless device comprising two or more SIMs/stacks such as, but not limited to, a mobile phone, a smartphone, a tablet, a phablet, a Personal Digital Assistant (PDA), a laptop, a computer, a wearable computing device, a vehicle infotainment device, an Internet of Things (IoT) device, a Wi-Fi router, a Universal Serial Bus (USB) dongle, or any other processing devices connected to wireless modems or with radio frequency (RF) processing capabilities. The two or more SIMs may be operated by one or more service providers. The two or more SIMs may support same or different communication paths 104a-104n to receive the one or more MBMS services 102a-102n. According to some example embodiments, operations described herein as being performed by the UE 100 may be performed by at least one processor (e.g., processor 204 discussed in association with FIG. 2) executing program code that includes instructions corresponding to the operations. The instructions may be stored in a memory of the UE 100 (e.g., memory 214 discussed in association with FIG. 2). The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multi-processor, an application-specific integrated circuit (ASIC), and a field programmable gate array (FPGA).

Further, the UE 100 may support one or more communication paths 104a-104n to receive the one or more MBMS services 102a-102n. The communication paths 104a-104n may be various channels supported by standards of wireless access systems, such as, but not limited to, 3rd Generation Partnership Project (3GPP), Long Term Evolution (LTE/4G), LTE-Advanced (LTE-A), 3GPP2, Code Division Multiple Access (CDMA), Frequency Division Multiple Access (FDMA), Time Division Multiple Access (TDMA), Orthogonal Frequency Division Multiple Access (OFDMA), General Packet Radio Service (GPRS), Enhanced Data rates for GSM Evolution (EDGE), Universal Mobile Telecommunications System (UMTS), Enhanced Voice-Data Optimized (EVDO), High Speed Packet Access (HSPA), HSPA plus (HSPA+), Wireless Local Area Network (WLAN), Worldwide Interoperability for Microwave Access (WiMAX/IEEE 802.16), Wi-Fi (IEEE 802.11), Universal Terrestrial Radio Access (UTRA), Evolved-UTRA (E-UTRA), 5G based wireless communication systems, 4G based wireless communication systems, Wi-Fi Direct, Bluetooth, Bluetooth Low Energy (BLE), or the like.

The UE 100 may be configured to receive information about the MBMS services 102a-102n transmitted over one or more communication paths 104a-104n by a MBMS server 106. The MBMS services 102a-102n may be, but are not limited to, a streaming service (streaming of multimedia data such as audio, video, text and so on), a file download service, a carousel service (combining file download service and streaming service), a television (TV) service, or the like. The MBMS server 106 may be deployed in a packet data communication system. Each MBMS service is uniquely identified by Temporary Mobile Group Identities (TMGIs) which consists of PLMN identity (ID) and service ID. The PLMN ID may be the unique ID provided for each communication path. The information about the available MBMS services (102a-102n) over each communication path (104a-104n) may be provided through Multicast Control Channels (MCCH). According to some example embodiments, operations described herein as being performed by the MBMS server 106 may be performed by at least one processor executing program code that includes instructions corresponding to the operations. The instructions may be stored in a memory of the MBMS server 106.

Further, the UE 100 creates a unified service guide 108 by combining the MBMS services 102a-102n received over the one or more communication paths 104a-104n. The unified service guide 108 may include information about the MBMS services, information about the one or more communication paths over which the MBMS services are transmitted and information about signal quality of the MBMS services.

Thereafter, a MBMS service may be selected automatically from the unified service guide 108. Also, the MBMS service may be selected at defined intervals or based on occurrence of one or more defined events. Further, a user 110 may select the MBMS service from the unified service guide 108. Based on the selected MBMS service, the UE 100 selects a communication path from the one or more communication paths 104a-104n. The communication path may be selected by checking one or more criteria that includes, but is not limited to, signal condition of Multicast Broadcast Single Frequency Network (MBSFN) cell, signal condition (MBMS reference signal strength (MRS), Reference Signal Received Power (RSRP), Signal-to-Interference-plus-Noise Ratio (SINR), service availability and packet switched (PS) enabled stack. Thereafter, the UE 100 provides the selected MBMS service over the selected communication path. Thus, the user 110 may receive the MBMS services 102a-102n with high signal quality over the selected communication path.

Figure 2:
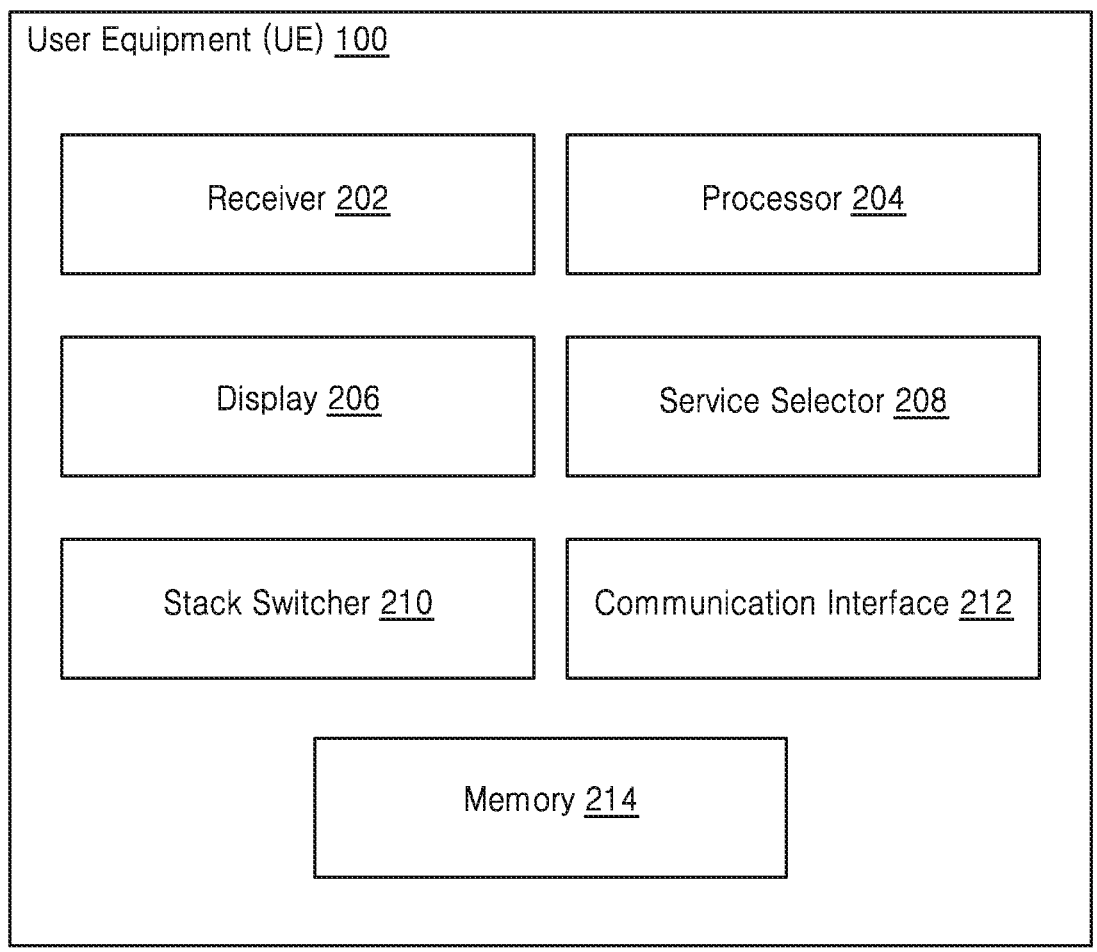
FIG. 2 is a block diagram illustrating a UE for receiving MBMS services, according to some example embodiments as disclosed herein.

FIG. 2 is a block diagram illustrating the UE 100 for receiving MBMS services, according to some example embodiments as disclosed herein.

As discussed above in association with FIG. 1, the UE 100 receives the MBMS services 102a-102n or the eMBMS services over the one or more communication paths 104a-104n and selects a communication path from the one or more communication paths 104a-104n to provide the one or more MBMS services 102a-102n to the user 110. The UE 100 may be, any wireless device comprising two or more SIMs/stacks such as, but not limited to, a mobile phone, a smartphone, a tablet, a phablet, a Personal Digital Assistant (PDA), a laptop, a computer, a wearable computing device, a vehicle infotainment device, an Internet of Things (IoT) device, a Wi-Fi router, a USB dongle, or any other processing devices connected to wireless modems or with Radio Frequency (RF) processing capabilities. The UE 100 includes a receiver 202, at least one processor 204, a display 206, a service selector 208, a stack switcher 210, a communication interface 212 and a memory 214. According to some example embodiments, operations described herein as being performed by any or all of the service selector 208 and the stack switcher 210 may be performed by at least one processor (e.g., the at least one processor 204) executing program code that includes instructions corresponding to the operations. The instructions may be stored in a memory of the UE 100 (e.g., the memory 214).

The receiver 202 may be configured to receive information about the MBMS services 102a-102n available over the one or more communication paths 104a-104n. The MBMS services 102a-102n may be, but are not limited to, a streaming service (streaming of multimedia data such as audio, video, text and so on), a file download service, a carousel service (combining file download service and streaming service), a television (TV) service, or the like. The one or more communication paths 104a-104n may be various channels supported by standards of wireless access systems, such as, but not limited to, 3rd Generation Partnership Project (3GPP), Long Term Evolution (LTE/4G), LTE-Advanced (LTE-A), 3GPP2, Code Division Multiple Access (CDMA), Frequency Division Multiple Access (FDMA), Time Division Multiple Access (TDMA), Orthogonal Frequency Division Multiple Access (OFDMA), General Packet Radio Service (GPRS), Enhanced Data rates for GSM Evolution (EDGE), Universal Mobile Telecommunications System (UMTS), Enhanced Voice-Data Optimized (EVDO), High Speed Packet Access (HSPA), HSPA plus (HSPA+), Worldwide Interoperability for Microwave Access (WiMAX/IEEE 802.16), Wi-Fi (IEEE 802.11), Evolved-UTRA (E-UTRA), 5G based wireless communication systems, 4G based wireless communication systems, Wi-Fi Direct, Bluetooth, Bluetooth Low Energy (BLE), or the like. The information about the MBMS services can be received through service guide information which may periodically transmitted by the MBMS server 106 or through any other means for example, Internet download, preconfigured service list in device and so on. According to some example embodiments, Radio Frequency (RF) arbitration can be performed to receive the available MBMS services. The receiver 202 may periodically monitor the MCCH to obtain the information about the available MBMS services.

The receiver 202 may use a Public Land Mobile Network (PLMN) ID indicated in TMGIs assigned to the MBMS services 102a-102 to determine the availability of the MBMS services 102a-102n over the one or more communication paths 104a-104n. The TMGI is a combination of the PLMN ID and service ID assigned for each MBMS service.

The receiver 202 may be further configured to continuously monitor the one or more communication paths 104a-104n for determining availability of new MBMS services. The receiver 202 may monitor a Multicast Control Channel (MCCH) change notification to determine the availability of the new MBMS services over the one or more communication paths 104a-104n. The MCCH change notification may be treated as paging for monitoring. A first SIM of the UE 100 may send MCCH notification timing data to a second SIM of the UE 100 to release Radio Frequency (RF) resources for receiving the MCCH change notification. In some example embodiments, for multi radio type of devices, the MCCH change notifications may be monitored independently without affecting the radio operations to determine the availability of the one or more new MBMS services.

The at least one processor 204 may be configured to create the unified service guide 108 by combining the MBMS services 102a-102n available over the one or more communication paths 104a-104n. The at least one processor 204 uses the information obtained through the MCCH and the service guide transmitted by MBMS server 106 to create the unified service guide 108 which provides the information about the MBMS services available over the communication paths. The unified service guide 108 includes information like, but not limited to, service IDs associated with the MBMS services, multiple communication paths on which the given MBMS service is available, QoS associated with each communication path and so on. The unified service guide 108 may be created using the PLMN ID of the TMGIs assigned to each of the MBMS services 102a-102n. The unified service guide 108 may act as a common interface that provides information about the availability of MBMS services 102a-102n over the one or more communication paths 104a-104n to the user 110. Also, the at least one processor 204 may update the unified service guide 108 by determining the availability of the new MBMS services over the one or more communication paths 104a-104n. In some example embodiments, the at least one processor 204 may update the unified service guide 108 in accordance with the signal conditions of a serving cell such as, but not limited to, MRS, SINR, RSRP and so on.

The service selector 208 may be configured to select a MBMS service automatically from the unified service guide 108. In some example embodiments, the MBMS service may be selected by an application on the UE 100 at defined intervals. In some example embodiments, the MBMS service may be selected based on occurrence of one or more defined events. The one or more pre-defined events can be, but not limited to, remainders set for the unavailable MBMS service which may be broadcasted at some specified time, a file download event which may start at a specific time and so on. Similarly, the user 110 may input a selection of the MBMS service from the unified service guide 108 to the service selector 208. The unified service guide 108 may be displayed to the user 110 by the display 206 for selecting the MBMS service. According to some example embodiments, the display 206 may be one or more of a monitor, a television, a touchscreen, a Liquid Crystal Display (LCD), or any other display capable of representing the unified service guide 108 to the user 110.

The service selector 208 may be further configured to select a communication path from the one or more communication paths 104a-104n for the selected MBMS service. The communication path may be selected by checking factors such as, but not limited to, signal condition of MBSFN cell, signal conditions, service availability of the selected MBMS service, PS enabled path or the like. Further, the signal conditions may be, but is not limited to, MRS, SINR, RSRP, or the like. The service selector 208 can select the communication path from the one or more communication paths 104a-104n based on a combination of at least one of the signal condition of the MBSFN cell, the signal conditions, the service availability of the selected MBMS service and the PS enabled stack. The service selector 208 can select the communication path for the reception of the MBMS service based on the PS enabled stack when the signal condition of the PS enabled stack is better than a pre-defined threshold. The selection of the communication path based on the PS enabled stack ensures the undisrupted reception of the MBMS service. On determining that the signal condition of the PS enabled stack is not satisfactory, then the service selector 208 selects the communication path based on the combination of at least one of the signal condition of the MBSFN cell, and the signal conditions. Further, the PS data may be switched to the stack/SIM which supports the selected communication path.

According to some example embodiments, the service selector 208 may monitor the signal condition of MBSFN cell, signal conditions, service availability of the selected MBMS service and so on periodically to select the communication path for reception of selected MBMS service. Some example embodiments herein are further explained considering the measuring of the signal conditions such as the MRS and the RSRP to select the communication path, but it may be obvious to a person of ordinary skill in the art that any other signal conditions can be measured to select the communication path. The RSRP and the MRS can be good indicators to justify the signal quality level of the MBMS services. According to some example embodiments, the service selector 208 measures the RSRP periodically while being camped on a cell. According to some example embodiments, the service selector 208 monitors the MRS while receiving the MBMS service. Further, the service selector 208 can schedule the measurement of the MRS and the RSRP based on at least one of an Access Point (AP) based periodic timer, detection of mobility across the cells and so on. Thus, the service selector 208 can estimate the signal quality of the MBMS services before providing the MBMS services to the user.

According to some example embodiments, the service selector 208 measures the signal condition of the MBSFN cell to select the communication path since the MBSFN cell with improved signal condition provides the enhanced MBNMS quality with less decoding error.

According to some example embodiments, the service selector 208 selects the communication path based on the PS enabled stack for reducing the RF interruption during the reception of the selected MBMS service. The service selector 208 gets the PS enabled stack information through AP when the PS is enabled on one stack. In the Dual SIM Dual Standby (DSDS) support or multi SIMs DS method, a radio frequency (RF) resource may be shared by the different SIMs. The RF resource may herein refer to a RF transceiver of the UE 100. If both the PS data (the Internet) and the MBMS services reside over different stack/SIM, then there may be more RF sharing and the service quality of the MBMS service can be degraded. If the both PS data and the MBMS service reside on the same stack, then the sharing of the RF resource may be less and the quality of the MBMS service can be enhanced. Thus, the service selector 208 selects the communication path supported by the SIM on which the PS data is enabled.

Further, on determining that the PS data and the MBMS service are available on the different stacks/SIM, then the service selector 208 instructs the stack unit 210 to switch the PS data to the stack/SIM where the MBMS service resides. Thus, the interruptions in reception of the MBMS service can be reduced since the RF resource may not switched to another SIM due to PS operations.

The stack switcher 210 may be configured to provide the selected MBMS service to the user 110 over the selected communication path among the one or more communication paths 104a-104n. The selected communication path can indicate the SIM that supports the selected MBMS service. The stack switcher 210 may be further configured to select at least one SIM supporting the selected communication path to provide the selected MBMS service to the user 110. In conventional UEs, if the MBMS service is provided on a different SIM from other mobile data, there may be frequent interruption for both the services resulting in a poor user experience. However, as discussed above, the stack switcher 210 may be configured to select the at least one SIM supporting the selected communication path. Accordingly, the user 110 may receive the MBMS service with high QoS and reduced interference.

In some example embodiments, the stack switcher 210 may select a packet switched (PS) enabled SIM supporting the selected communication path to provide the selected MBMS service to the user 110. Further, when the stack switcher 210 determines the MBMS services 102a-102n and PS data running on the different SIMs of the UE 100, the MBMS services 102a-102n and the PS data being operated by different service providers, the stack switcher 210 performs switching of the different SIMs to provide the selected MBMS service to the user. The switching of the different SIMs involves switching releasing RF resources used by a first SIM supporting PS data and making the released RF resources available for use by a second SIM supporting the communication path over which the MBMS service is available. Thus, results in reducing interruption in the MBMS services reception on one SIM when PS data is enabled on another SIM.

In some example embodiments, the stack switcher 210 may perform switching of the one or more communication paths 104a-104n over which the MBMS services are currently available. The one or more communication paths may be switched in accordance with the signal conditions, such as, but not limited to, MRS, RSRP, SINR and so on.

The stack switcher 210 may be further configured to allow the user 110 to select a SIM via which the user wants to receive the MBMS services and/or mobile data service. The user 110 may receive an indication for selecting the SIM supporting any one of the communication paths to receive the selected MBMS service. Also, the SIM supporting the MBMS services may be selected by the stack switcher 210. Further, in case the mobile data and the MBMS services are supported by two different SIMs, the stack switcher 210 assists the user 110 in turning off the mobile data, switching the RF resources to the SIM supporting the MBMS services or switching the MBMS services to the SIM with active PS data.

The communication interface 212 may be configured to establish communication between external entities, such as the MBMS server 106, and on the UE 100. According to some example embodiments, the communication interface 212 may be implemented using a circuit and/or at least one processor (e.g., at least one processor 204) executing firmware stored in a memory (e.g., memory 214).

The memory 214 may be configured to store the unified service guide 108 and information about the signal quality used for MBMS services. The memory 214 may include one or more computer-readable storage media. The memory 214 may include non-volatile storage elements. Examples of such non-volatile storage elements may include magnetic hard discs, optical discs, floppy discs, flash memories, or forms of electrically programmable memories (EPROM) or electrically erasable and programmable memories (EEPROM). In addition, the memory 214 may, in some examples, be considered a non-transitory storage medium. The term "non-transitory" may indicate that the storage medium is not embodied in a carrier wave or a propagated signal. However, the term "non-transitory" should not be interpreted to mean that the memory 214 is non-movable. The memory 214 may be configured to store larger amounts of information than the memory. For example, a non-transitory storage medium may store data that may, over time, change (e.g., in Random Access Memory (RAM) or cache).

FIG. 2 shows components of the UE 100 (e.g., the receiver 202, the at least one processor 204, the display 206, the service selector 208, the stack switcher 210, the communication interface 212 and the memory 214, but it is to be understood that some example embodiments are not limited thereon. In some example embodiments, the UE 100 may include less or more components. Further, the labels or names of the components are used only for illustration and does not limit the scope of some example embodiments. One or more components may be combined together to perform the same or a similar function in the UE 100.

Figure 3:
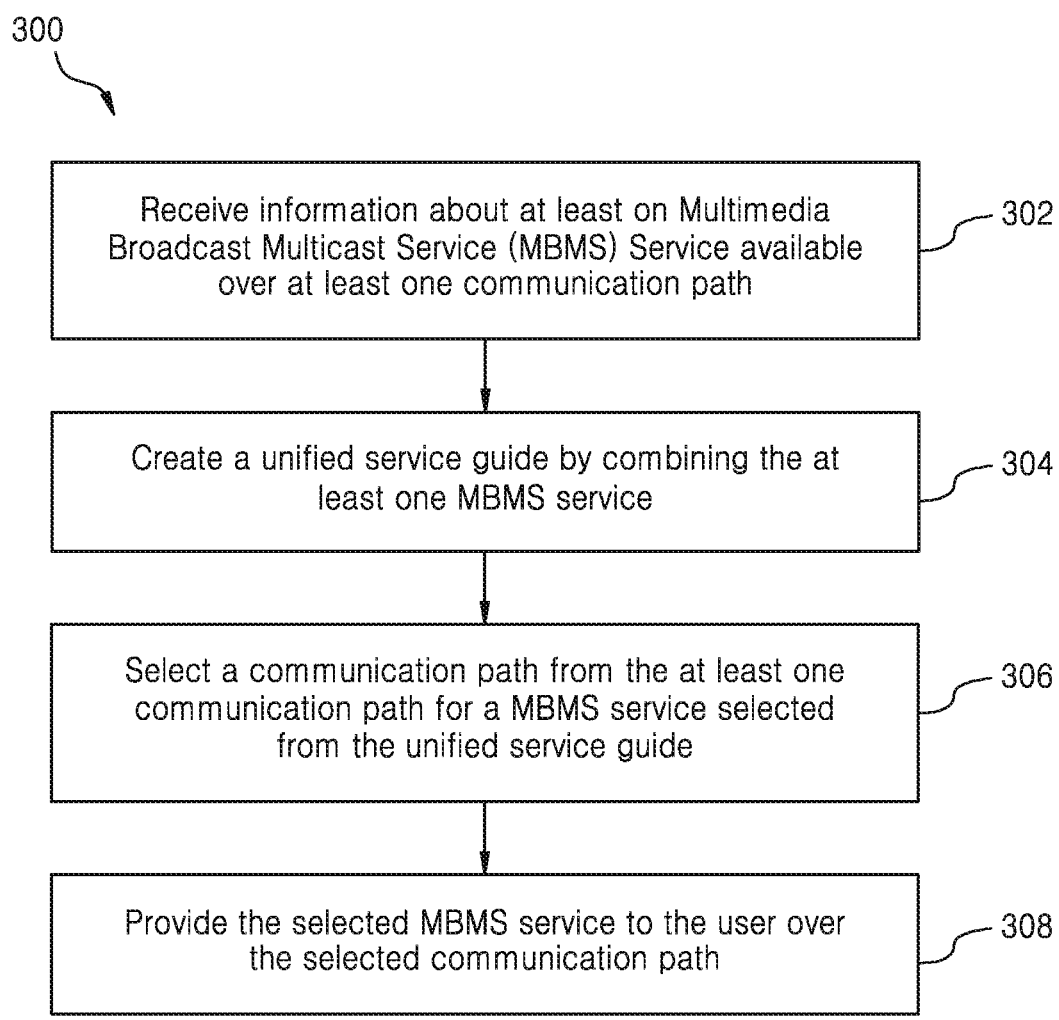
FIG. 3 is a flow diagram illustrating a method for enabling reception of MBMS services on a UE supporting two or more SIMs, according to some example embodiments as disclosed herein.

FIG. 3 is a flow diagram illustrating a method for enabling reception of MBMS services on the UE 100 supporting two or more subscriber identity modules (SIMs), according to some example embodiments as disclosed herein.

At operation 302, the method includes receiving information about the MBMS services 102*a*-102*n* or the eMBMS services available over the one or more communication paths 104*a*-104*n*. The receiver 202 may receive information about the MBMS services 102*a*-102*n* available over the one or more communication paths 104*a*-104*n*. The MBMS services 102*a*-102*n* may be, but is not limited to, a streaming service (streaming of multimedia data such as audio, video, text and so on), a file download service, a carousel service (combining file download service and streaming service), a television (TV) service, or the like. The one or more communication paths 104*a*-104*n* may be various channels supported by standards of wireless access systems, such as, but not limited to, 3rd Generation Partnership Project (3GPP), Long Term Evolution (LTE/4G), LTE-Advanced (LTE-A), 3GPP2, Code Division Multiple Access (CDMA), Frequency Division Multiple Access (FDMA), Time Division Multiple Access (TDMA), Orthogonal Frequency Division Multiple Access (OFDMA), General Packet Radio Service (GPRS), Enhanced Data rates for GSM Evolution (EDGE), Universal Mobile Telecommunications System (UMTS), Enhanced Voice-Data Optimized (EVDO), High Speed Packet Access (HSPA), HSPA plus (HSPA+), Worldwide Interoperability for Microwave Access (WiMAX/IEEE 802.16), Wi-Fi (IEEE 802.11), Evolved-UTRA (E-UTRA), 5G based wireless communication systems, 4G based wireless communication systems, Wi-Fi Direct, Bluetooth, Bluetooth Low Energy (BLE), or the like.

At operation 304, the method includes creating the unified service guide 108 by combining the MBMS services 102*a*-102*n* received over the one or more communication paths 104*a*-104*n*. The at least one processor 204 may create the unified service guide 108 by combining the MBMS services 102*a*-102*n* received over the one or more communication paths 104*a*-104*n*. Thus, the unified service guide 108 acts as a common interface by providing a list of available MBMS services to the user 110.

At operation 306, the method includes selecting a communication path among the one or more communication paths 104*a*-104*n* for an MBMS service selected from the unified service guide 108. The service selector 208 may select the communication path among the one or more communication paths 104*a*-104*n* for an MBMS service selected from the unified service guide 108. The MBMS service may be selected automatically from the unified service guide 108. Also, the MBMS service may be selected at defined intervals or based on occurrence of one or more defined events. Further, the user 110 may select the MBMS service from the unified service guide 108. The communication path may be selected by checking factors related to the one or more MBMS services such as, but not limited to, signal condition of MBSFN cell, signal conditions, service availability of the selected MBMS service, or the like. Further, the signal conditions may be, but are not limited to MRS, SINR, RSRP, or the like. Further, availability of the selected MBMS service may be checked in the unified service guide 108. If the selected MBMS service is not available in the unified service guide 108, then the MCCH change notifications may be monitored. Thus, when the selected MBMS service becomes available over any one of the communication paths 104*a*-104*n*, the user may be informed about the availability of the selected service.

At operation 308, the method includes providing the selected MBMS service to the user over the selected communication path. The stack switcher 210 may provide the selected MBMS service to the user over the selected communication path selected. In conventional UEs with Dual Subscriber Identification Module (SIM) Dual Standby (DSDS) support, MBMS services activate only on a packet switched (PS) data enabled SIM. Also, if multiple communication paths exist, a user may experience Quality of Service (QoS) and call performance issues, a set of available MBMS services may be limited, and availability of desired MBMS services may not be monitored. However, through the operations of the method described in association with FIG. 3, a wider range of MBMS services may be provided to the user 110 with better QoS.

The various actions, acts, blocks, operations, or the like in the method and the flow diagram 300 may be performed in the order presented, in a different order or contemporaneously. Further, in some example embodiments, some of the actions, acts, blocks, operations, or the like may be omitted, added, modified, skipped, or the like without departing from the scope of some example embodiments.

Figure 4:
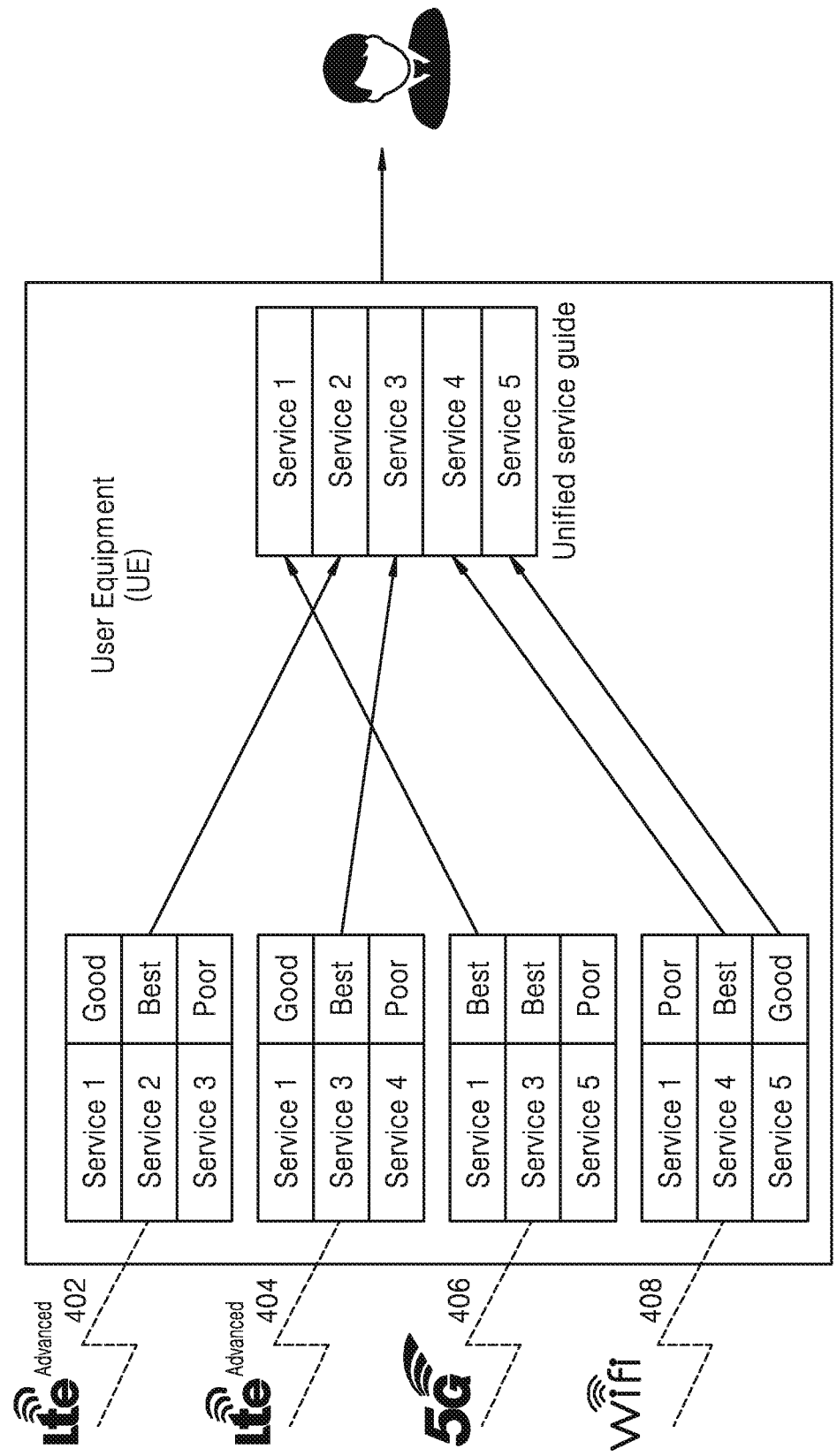
FIG. 4 is an example illustration of unified service guide creation, according to some example embodiments as disclosed herein.

FIG. 4 is an example illustration of unified service guide creation, according to some example embodiments as disclosed herein.

According to some example embodiments, the unified service guide may be created by combining the MBMS services available over the multiple communication paths. The UE illustrated in FIG. 4 may comprise two or more SIMs and support the multiple communication paths. The multiple communication paths may be channels supported by standards of respective wireless access systems such as, LTE, 5G, Wi-Fi and so on. As illustrated in FIG. 4, a first communication path 402 supported by LTE may receive MBMS services like a service 1, a service 2 and a service 3. A second communication path 404 supported by LTE of a different service provider may receive the service 1, the service 3 and a service 4. Similarly, a third communication path 406 supported by 5G may receive the service 1, the service 3 and a service 5. A fourth communication path 408 supported by Wi-Fi may receive the service 1, the service 4 and the service 5. Further, a QoS of each service is determined by, for example, checking the MRS of the services 1-5 over LTE, 5G and Wi-Fi. The services 1-5 may be, but are not limited to, a streaming service (streaming of multimedia data such as audio, video, text and so on), a file download service, a carousel service (combining file download service and streaming service), a television (TV) service, or the like. By combining the services 1-5, a unified service guide may be created by the at least one processor 204. According to some example embodiments, the unified service guide include an indication of each MBMS service available over the multiple communication paths (e.g., services 1-5) in association with the communication path over which the respective service is provided at the highest QoS. According to some example embodiments, the unified service guide includes an indication of each MBMS service available over the multiple communication paths (e.g., service 1-5) in association with all communication paths over which the respective service is provided. The unified service guide provides a list of services that are available over the first and second LTE operated by different operators, 5G and Wi-Fi. Thus, the unified service guide communicates information about the MBMS services available over the multiple communication paths to the user.

Figure 5A:
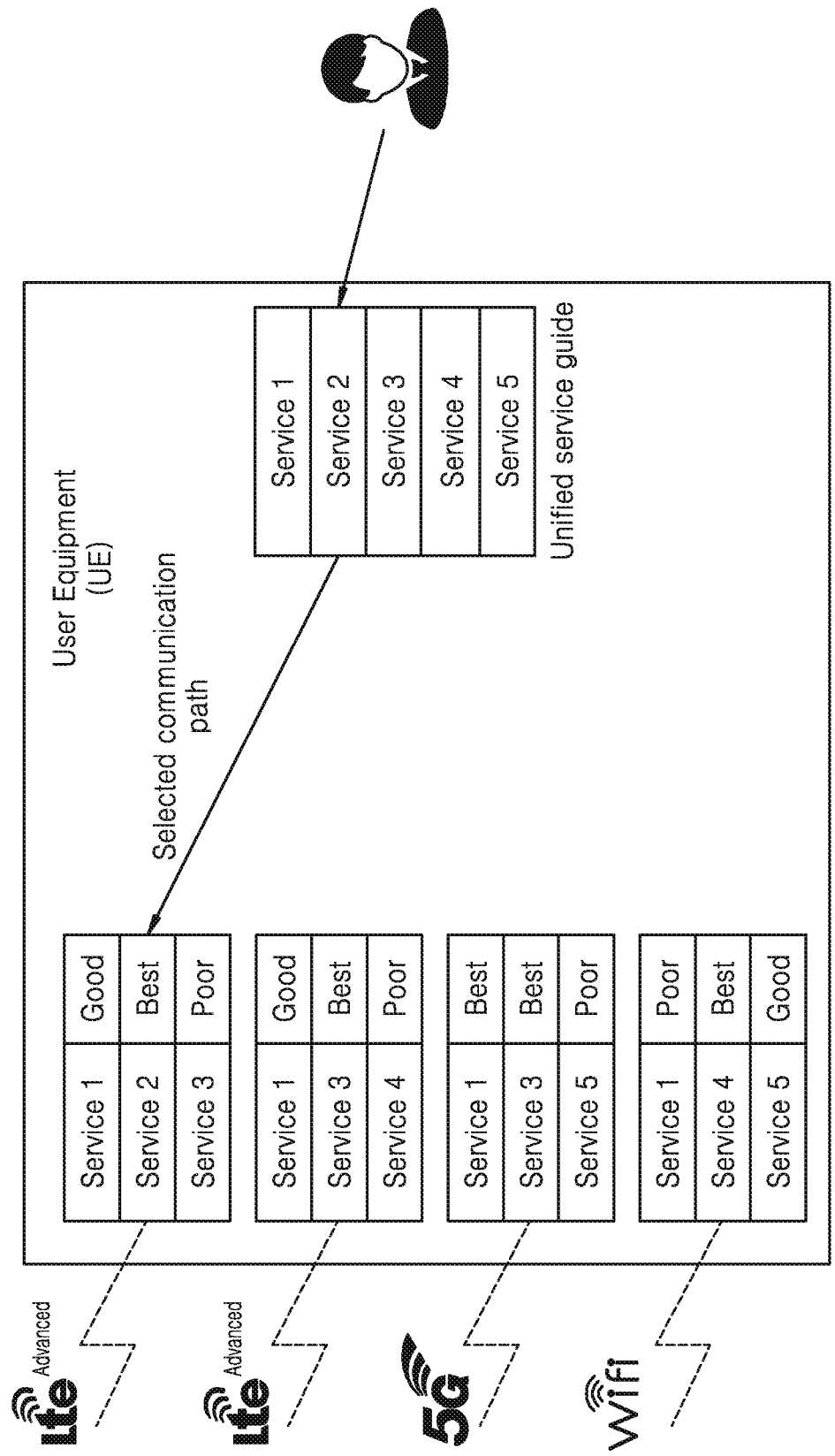
FIGS. 5a and 5b are example illustrations of selection of a communication path for providing a selected MBMS service to a user, according to some example embodiments as disclosed herein.
Figure 5B:
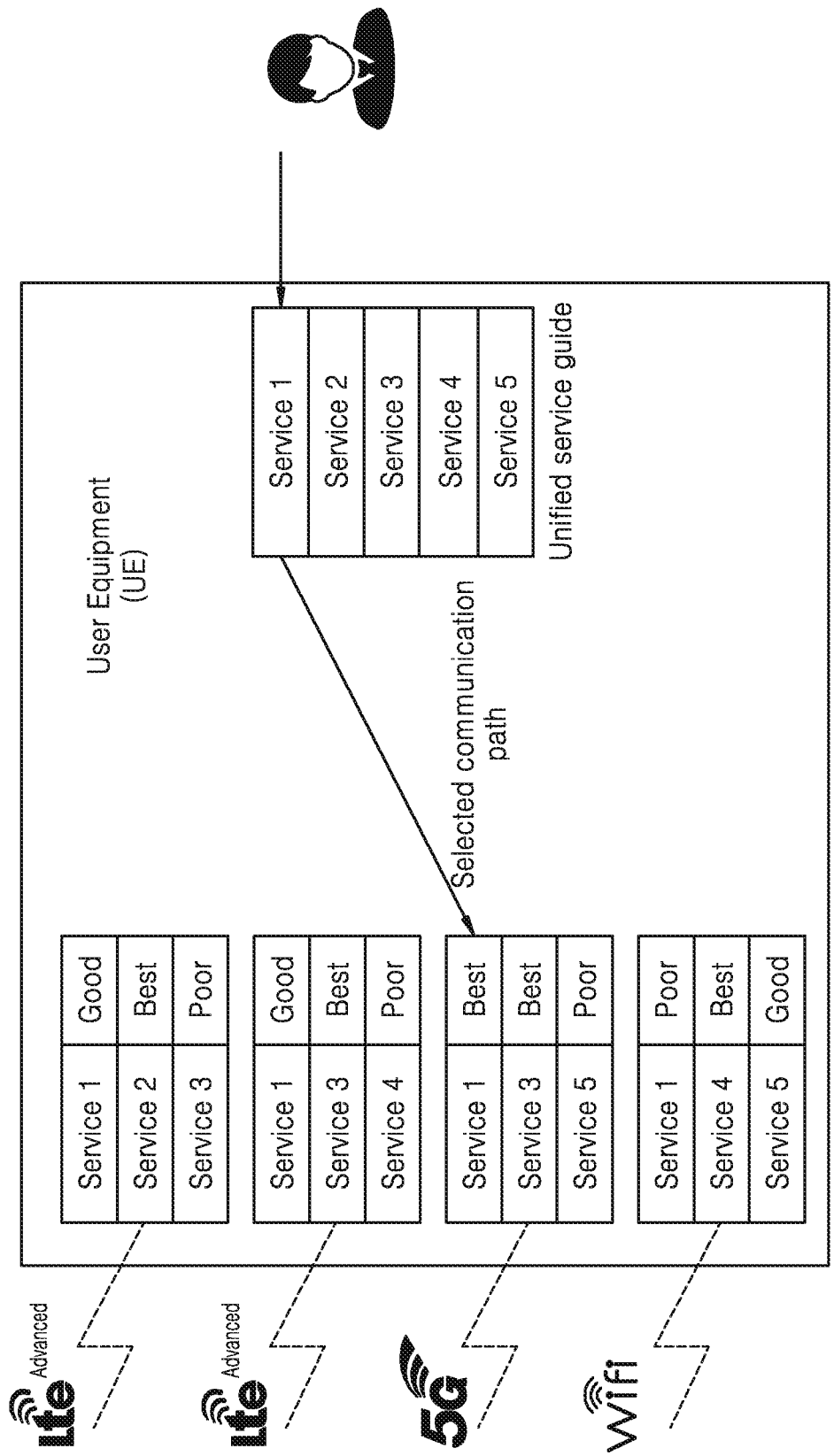

FIGS. 5a and 5b are example illustrations of selection of a communication path for providing a selected MBMS service to a user, according to some example embodiments as disclosed herein.

FIG. 5a is an example illustration of selection of a communication path based on service availability of the selected MBMS service. According to some example embodiments, the communication path for providing the selected MBMS service to the user is selected by checking the service availability of the selected MBMS service over the multiple communication paths. The MBMS services may be, but are not limited to, a streaming service (streaming of multimedia data such as audio, video, text and so on), a file download service, a carousel service (combining file download service and streaming service), a television (TV) service, or the like. The UE illustrated in FIG. 5a may comprise two or more SIMs and support the communication paths such as LTE operated by different service providers, 5G and so on.

The unified service guide may be displayed to the user by the display 206. When displayed, the unified service guide may provide a list of each MBMS service available over the multiple communication paths (e.g., the LTE, 5G and Wi-Fi communication paths). When the user selects a particular service, for example, the service 2, from the unified service guide, the communication path may be selected for the service 2 by checking the service availability of the service 2 over the communication paths by the service selector 208. The first communication path supported by LTE may be selected, as the service 2 with highest QoS is available on the first communication path supported by LTE. Also, the communication path supported by LTE may be the only one path which provides the service 2. Thereby, the service 2 is provided to the user over the first communication path supported by LTE.

FIG. 5b is an example illustration of selection of the communication path based on the service availability of the selected MBMS service and QoS associated with the selected MBMS service. According to some example embodiments, the communication path for providing the selected MBMS service to the user is selected by checking the QoS associated with the MBMS service and the service availability of the selected service over the multiple communication paths. The QoS may be determined for each MBMS service by checking signal conditions such as, MRS, RSRP, SINR, PS data path and so on. The UE illustrated in FIG. 5b may comprise two or more SIMs supporting the communication paths such as LTE, 5G and so on. The unified service guide may be displayed to the user by the display 206. The user selects a particular service, for example, service 1. Then, the communication path may be selected by checking the service availability of service 1 over each communication path (LTE, 5G and Wi-Fi) and further checking the QoS related to the service 1 available over each communication path (LTE, 5G and Wi-Fi) by the service selector 208. The communication path supported by 5G may be selected as the communication path, as the service 1 with highest QoS is available on the communication path supported by 5G.

Figure 6:
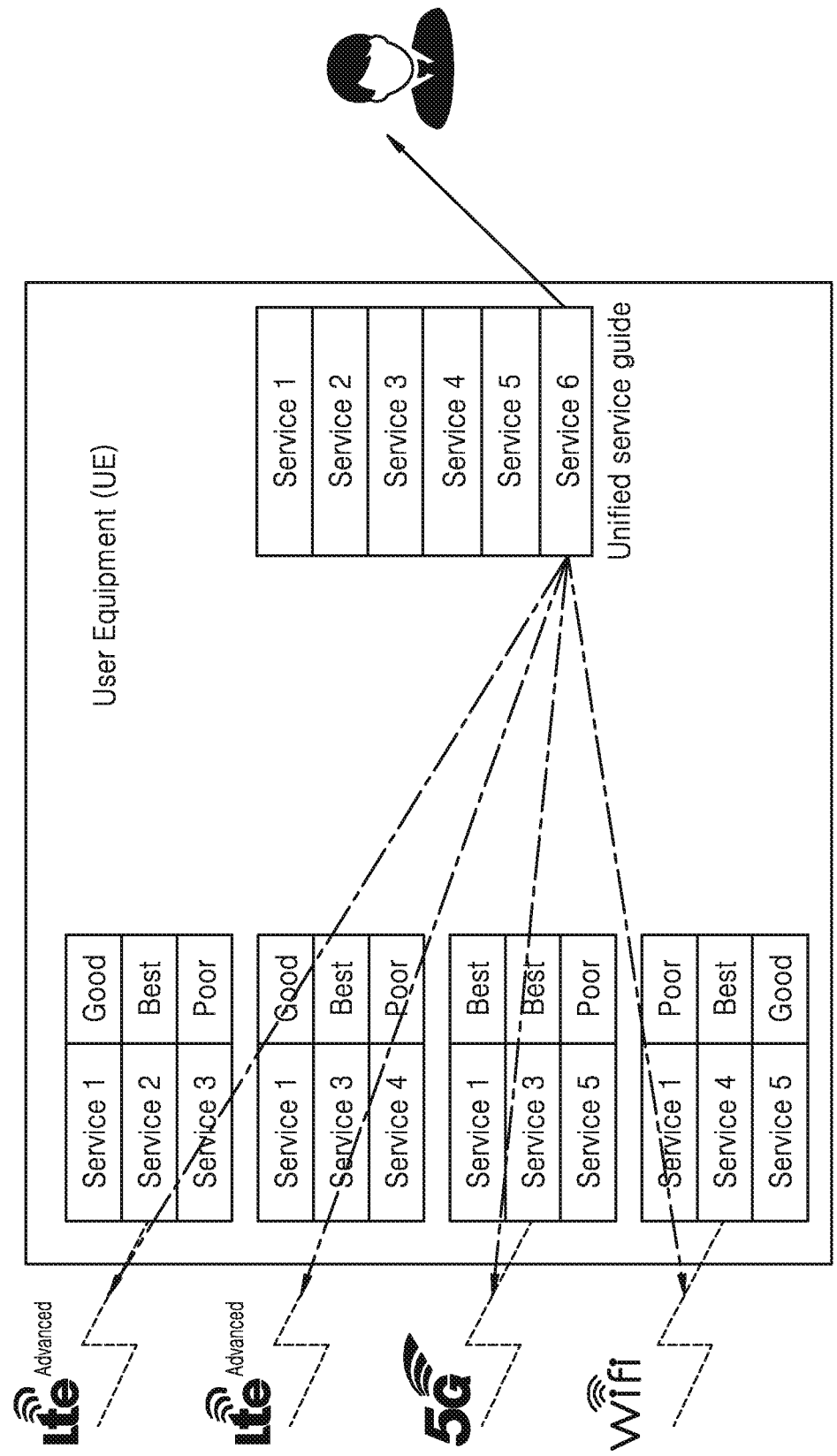
FIG. 6 is an example scenario illustrating desired MBMS service monitoring on multiple communication paths, according to some example embodiments as disclosed herein.

FIG. 6 is an example scenario illustrating interested MBMS service monitoring on multiple communication paths, according to some example embodiments as disclosed herein.

According to some example embodiments the multiple communication paths are monitored to detect availability of desired service. For example, the services 1-5 may be available over LTE, 5G and Wi-Fi, but the user may show interest for service 6 and the service 6 may not be available at the moment. Thus, the communication paths (supported by LTE, 5G and Wi-Fi) may be continuously monitored for the MCCH change notifications. The MCCH change notifications indicate the availability of new MBMS services provided in a MBSFN area. When the service 6 becomes available over any one of the communication paths, the unified service guide may be updated and communicated to the user.

Figure 7:
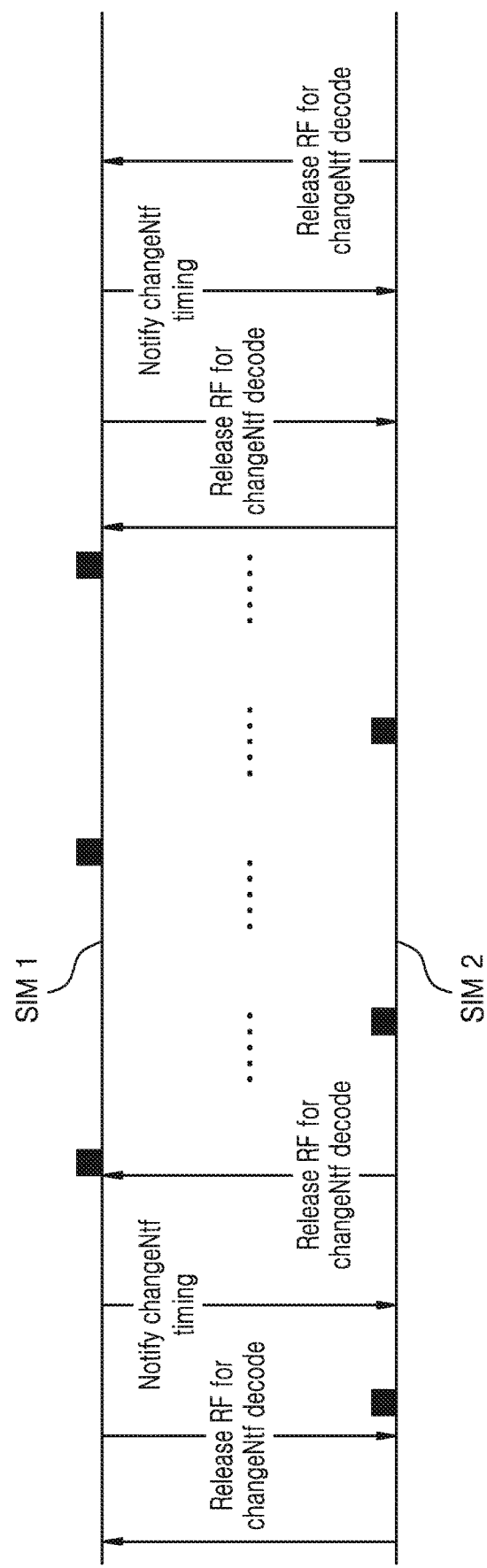
FIG. 7 is an example illustration of a Radio Frequency (RF) sharing mechanism for MBMS change notification, according to some example embodiments as disclosed herein.

FIG. 7 is an example illustration of Radio Frequency (RF) sharing mechanism for MBMS change notification, according to some example embodiments as disclosed herein.

As discussed above in association with FIG. 6, when a user desired service is not available, the MCCH change notification may be monitored. The MCCH change notifications may broadcast at a specified occasion. A MCCH change notification timing may be shared between the SIMs of the UE 100 for ensuring RF resource availability for receiving the MCCH change notification. Thus, when the UE 100 receives the MBMS change notifications as soon as possible, the MBMS service can be provided to the user without any delay if the user is interested.

For example, the MCCH change notification (Ntf) timing (e.g. scheduling time) for a SIM 1 is indicated to a SIM-2 by sending signals from the SIM 1 to the SIM 2. The MCCH change notifications are represented by black squares as illustrated in FIG. 7. The signals sent to the SIM 2 may be "Release RF for change Ntf decode" (representing reception of MCCH change notification) and "Notify Change (Ntf) timing. Each signal indicates the change notification timing to the communication paths and requirement of releasing RF at that time. The SIM-2, which is aware of MCCH change notification, can release RF resources at the MCCH change notification timing of SIM-1. The SIM 2 can send the signal 'Release RF for change Ntf decode" to the SIM 1 by acknowledging the release of the RF resources. Thus, RF arbitration can be performed for receiving the RCCH change notification. In accordance with the RF arbitration, availability of the RF resources for reception of the MCCH change notification can be ensured.

Some example embodiments herein enable the UE 100 to monitor the MCCH and MCCH change notifications on all the available communication paths instead of monitoring the MCCH change notification for the selected path. Thus, the wider range of available MBMS services can be determined. Further, the UE 100 may monitor the signal conditions of the selected MBMS services to select the communication path over which the MBMS service with the high signal strength can be provided to the user.

Some example embodiments disclosed herein may be implemented through at least one software program running on at least one hardware device and performing network management functions to control the elements. The elements shown in FIG. 2 and FIG. 3 may be at least one of a hardware device, or a combination of hardware device and software module.

The various operations of methods described above may be performed by any suitable means capable of performing the operations, such as various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with the some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing description of some example embodiments will so fully reveal the general nature of some example embodiments herein that others can, by applying current knowledge, readily modify and/or configure for various applications some example embodiments without departing from the generic concepts, and, therefore, such configurations and modifications should and are intended to be comprehended within the meaning and range of equivalents of some example embodiments. It is to be understood that the phraseology or terminology employed herein is for description and not of limitation. Therefore, while some example embodiments herein have been described, those skilled in the art will recognize that some example embodiments herein may be practiced with modification within the spirit and scope of some example embodiments as described herein.

What is claimed is:

1. A method performed by a User Equipment (UE) for enabling Multimedia Broadcast Multicast Services (MBMS) reception, the method comprising:
   creating, by at least one processor, a unified service guide by aggregating multiple MBMS services over a plurality of communication paths, wherein the unified service guide includes an indications for each distinctive MBMS service among the multiple MBMS services;
   receiving, by the at least one processor, a user input selecting a MBMS service among the multiple MBMS services from the unified service guide, the selected MBMS service being available over two or more communication paths among the plurality of communication paths;
   selecting, by the at least one processor, a first communication path among the two or more communication paths in response to the receiving; and
   providing, by the at least one processor, the selected MBMS service over the selected communication path.

2. The method of claim 1, further comprising:
   outputting, by the at least one processor, the unified service guide to a display.

3. The method of claim 1, wherein the selecting the first communication path selects the first communication path based on at least one of a signal condition of Multicast Broadcast Single Frequency Network (MBSFN) cell, signal conditions of a serving cell, service availability or a packet switched (PS) enabled stack.

4. The method of claim 3, wherein the signal conditions of the serving cell include at least one of a MBMS reference signal (MRS) strength, a Signal-to-Interference-plus-Noise Ratio (SINR) or a Reference Signal Received Power (RSRP).

5. The method of claim 1, wherein the selected communication path is supported by at least one packet switched (PS) enabled Subscriber Identity Module (SIM) of the UE.

6. The method of claim 1, further comprising:
   continuously monitoring, by the at least one processor, the one or more communication paths among the plurality of communication paths for availability of at least one new MBMS service by
      monitoring a Multicast Control Channel (MCCH) for availability of the at least one new MBMS service over the one or more communication paths, and
      performing Radio Frequency (RF) arbitration to ensure RF availability to the one or more communication paths around a MCCH change notification scheduling time by enabling at least one first SIM of the UE to inform at least one second SIM of the UE of the MCCH change notification scheduling time for reception of the at least one new MBMS service.

7. The method of claim 6, further comprising:
   updating, by the at least one processor, the unified service guide in response to determining the availability of the at least one new MBMS service.

8. The method of claim 7, wherein the updating is based on at least one of a MRS, a SINR or a RSRP.

9. The method of claim 1, further comprising:
switching, by the at least one processor, the selected communication path from the first communication path to a second communication path among the two or more communication paths based on at least one of a MRS, a SINR or a RSRP.

10. The method of claim 1, further comprising:
determining, by the at least one processor, that PS data and the selected MBMS service are contemporaneously running on at least two SIMs of the UE, the PS data and the selected MBMS service corresponding to different service providers; and
switching, by the at least one processor, access to an RF resource from a first SIM of the at least two SIMs supporting the PS data to a second SIM of the at least two SIMs supporting the selected MBMS service.

11. The method of claim 1, wherein two or more MBMS services among the multiple MBMS services are available over each of the plurality of communication paths.

12. The method of claim 1, wherein each of the plurality of communication paths corresponds to a different radio access technology.

13. The method of claim 1, wherein the unified service guide includes an indication for each distinctive communication path among the plurality of communication paths.

14. The method of claim 1, wherein the unified service guide includes an indication of a respective signal quality corresponding to each of the plurality of communication paths.

15. The method of claim 1, wherein the unified service guide includes an indication of a respective signal quality corresponding to each of the multiple MBMS services.

16. The method of claim 9, further comprising:
providing, by the at least one processor, the selected MBMS service over the selected communication path after the switching.

17. A method performed by a User Equipment (UE) for enabling Multimedia Broadcast Multicast Services (MBMS) reception, the method comprising:
creating a unified service guide by aggregating multiple MBMS services over a plurality of communication paths, wherein the unified service guide includes an indications for each distinctive MBMS service among the multiple MBMS services;
receiving a user input selecting a MBMS service among the multiple MBMS services from the unified service guide, the selected MBMS service being available over two or more communication paths among the plurality of communication paths;
selecting a communication path among the two or more communication paths in response to the receiving; and
providing the selected MBMS service over the selected communication path.

18. The method of claim 17, further comprising:
displaying the unified service guide on a display.

19. The method of claim 17, wherein the selecting the communication path selects the communication path based on at least one of a signal condition of Multicast Broadcast Single Frequency Network (MBSFN) cell, signal conditions of a serving cell, service availability or a packet switched (PS) enabled stack.

20. A user equipment (UE) for receiving Multimedia Broadcast Multicast Services (MBMS), the UE comprising:
a memory storing computer-readable instructions; and
at least one processor configured to execute the computer-readable instructions to
create a unified service guide by aggregating multiple MBMS services over a plurality of communication paths, wherein the unified service guide includes an indications for each distinctive MBMS service among the multiple MBMS services,
receive a user input selecting a MBMS service from the unified service guide, the selected MBMS service being available over two or more communication paths among the plurality of communication paths,
select a communication path among the two or more communication paths in response to receiving the user input, and
provide the selected MBMS service over the selected communication path.

* * * * *